United States Patent
Ijadi-Maghsoodi et al.

(10) Patent No.: US 10,618,788 B2
(45) Date of Patent: Apr. 14, 2020

(54) HOIST CABLE LOAD SENSOR

(71) Applicant: Goodrich Corporation, Charlotte, NC (US)

(72) Inventors: Bejan Ijadi-Maghsoodi, Diamond Bar, CA (US); Raymond E. Peto, Newport Beach, CA (US); David R. Lopes, Fullerton, CA (US)

(73) Assignee: Goodrich Corporation, Charlotte, NC (US)

( * ) Notice: Subject to any disclaimer, the term of this patent is extended or adjusted under 35 U.S.C. 154(b) by 249 days.

(21) Appl. No.: 15/602,654

(22) Filed: May 23, 2017

(65) Prior Publication Data
US 2018/0339891 A1    Nov. 29, 2018

(51) Int. Cl.
| B66F 17/00 | (2006.01) |
| B66D 1/58 | (2006.01) |
| B66D 1/54 | (2006.01) |
| B66C 13/16 | (2006.01) |
| B66D 3/18 | (2006.01) |

(Continued)

(52) U.S. Cl.
CPC ............... *B66F 17/00* (2013.01); *B64D 1/22* (2013.01); *B66C 13/16* (2013.01); *B66D 1/00* (2013.01);

(Continued)

(58) Field of Classification Search
CPC ... B66D 1/00; B66D 1/54; B66D 1/58; B66D 1/60; B66D 3/18; B64C 1/22; B66C 23/90; G01L 5/10; B64D 1/22; B66F 17/00
See application file for complete search history.

(56) References Cited

U.S. PATENT DOCUMENTS

| 3,809,334 A | * | 5/1974 | Beurer | ...................... | B64D 1/22 |
| | | | | | 242/397.3 |
| 6,044,991 A | * | 4/2000 | Freudenthal | ............ | B66C 23/90 |
| | | | | | 212/278 |

(Continued)

FOREIGN PATENT DOCUMENTS

| CN | 104671137 A | 6/2015 |
| DE | 102007048279 A1 | 4/2009 |
| WO | WO2016007796 A1 | 1/2016 |

OTHER PUBLICATIONS

Anonymous: "Getting the best from your load pin", LCM Systems Solution in Load Cell Technology, Oct. 15, 2018, XP002785703, Retrieved from the Internet: URL: http://www.lcmsystems.com/resources/load_pin_application_note. html, 5 pages.

(Continued)

*Primary Examiner* — Michael E Gallion
(74) *Attorney, Agent, or Firm* — Kinney & Lange, P.A.

(57) ABSTRACT

A load sensing device for a rescue hoist includes a load pin mounted coaxially with a traction sheave. A cable extends from a cable drum and over the traction sheave before exiting the rescue hoist. The traction sheave is rotatably driven about a traction sheave axis to maintain a back tension on the portion of the cable extending between the cable drum and the traction sheave. When the cable is loaded, strain gauges in the load pin sense a strain on the load pin caused by the load, and the strain information is communicated to a load calculator. Entry angle information is also determined and communicated to the load calculator. The load calculator determines the load on the cable based on the strain information and the entry angle information.

17 Claims, 4 Drawing Sheets

(51) Int. Cl.
*B66D 1/00* (2006.01)
*B64D 1/22* (2006.01)
*B66D 1/60* (2006.01)
*B64C 1/22* (2006.01)
*B66C 23/90* (2006.01)
*G01L 5/10* (2020.01)

(52) U.S. Cl.
CPC ............... *B66D 1/54* (2013.01); *B66D 1/58* (2013.01); *B66D 1/60* (2013.01); *B66D 3/18* (2013.01); *B64C 1/22* (2013.01); *B66C 23/90* (2013.01); *G01L 5/10* (2013.01)

(56) References Cited

U.S. PATENT DOCUMENTS

| | | | |
|---|---|---|---|
| 7,353,959 B2* | 4/2008 | Zakula, Sr. | B66C 13/22 212/278 |
| 8,370,031 B2 | 2/2013 | Claxton | |
| 2006/0085118 A1* | 4/2006 | Baldwin | E02F 3/48 701/50 |
| 2008/0019815 A1* | 1/2008 | Harris | B66C 23/80 414/563 |
| 2010/0262384 A1* | 10/2010 | Marfani | B65H 59/40 702/43 |
| 2013/0054054 A1* | 2/2013 | Tollenaere | B64D 1/22 701/3 |
| 2013/0239649 A1* | 9/2013 | Jamieson | B63B 21/00 73/1.15 |
| 2018/0029853 A1* | 2/2018 | Hamaguchi | B66C 23/82 |

OTHER PUBLICATIONS

Extended European Search Report for European Patent Application No. 18172732.2, dated Oct. 30, 2018, 10 pages.

* cited by examiner

HOIST CABLE LOAD SENSOR

BACKGROUND

This disclosure relates generally to hoists. More particularly, this application relates to load sensing for rescue hoists for aircraft.

Rescue hoists deploy and retrieve a cable from a cable drum to hoist persons or cargo. The rescue hoists can be mounted to an aircraft, such as a helicopter, by a support. A motor and gear train drive the cable drum to cause the cable drum to rotate and thus deploy or retrieve the cable. Rescue hoists typically include additional components, such as an overload clutch, to provide overload protection to the hoist. However, rescue hoists do have a maximum load capacity, and if the load on the cable exceeds the load capacity, then the rescue hoist, the aircraft, or both can be damaged. The load on the cable affects mission safety for the crew, the rescue hoist, the object being hoisted, and the aircraft.

SUMMARY

According to one aspect of the disclosure, a load sensing device for a rescue hoist includes a load pin extending into a first side of a traction sheave and disposed coaxially with the traction sheave on a traction sheave axis, and a load calculator connected to the load pin, the load calculator configured to receive a sensed strain from the load pin, to determine an entry angle of the cable to the traction sheave, and to determine a cable load based on the sensed strain and the entry angle. The traction sheave is configured to be rotatably driven relative to the load pin.

According to another aspect of the disclosure, a rescue hoist includes a cable drum rotatable about a cable drum axis, a stationary frame supporting the cable drum, a traction sheave configured to maintain a back tension on a portion of a cable extending between the cable drum and the traction sheave, the traction sheave rotatable about a traction sheave axis, a load pin extending into a first side of the traction sheave and disposed coaxially with the traction sheave, a cable disposed on the cable drum in a plurality of cable wrap layers, and a load calculator connected to the load pin and configured to receive a sensed strain from the load pin, to determine an entry angle of the cable to the traction sheave, and to determine a cable load based on the sensed strain and the entry angle. The load pin includes a body including a distal end and a bore extending through the body, the distal end extending at least partially into the traction sheave and a strain gauge mounted within the bore.

According to yet another aspect of the disclosure, a method of sensing a load on a cable of a rescue hoist includes sensing, with a strain gauge disposed in a load pin, a strain caused by the load on the cable, wherein the load pin is cantilevered from a stationary housing of the rescue hoist and a distal end of the load pin extends into a traction sheave, is disposed coaxially with the traction sheave, and supports the traction sheave; providing the sensed strain to a processor of a computer; determining, with the processor of the computer, a length of cable deployed from the rescue hoist with the processor, which one of a plurality of cable wrap layers is supplying the cable to the traction sheave based the length of cable deployed, and an entry angle of the rescue hoist cable to the traction sheave based on the one of the plurality of cable wrap layers providing the cable to the traction sheave; recalling, from a memory of the computer, a look-up table; and determining, with the processor of the computer, the load on the cable based on an intersection of a first variable and a second variable in the look-up table, wherein the first variable is the entry angle and the second variable is the sensed strain.

DETAILED DESCRIPTION

Figure 1:
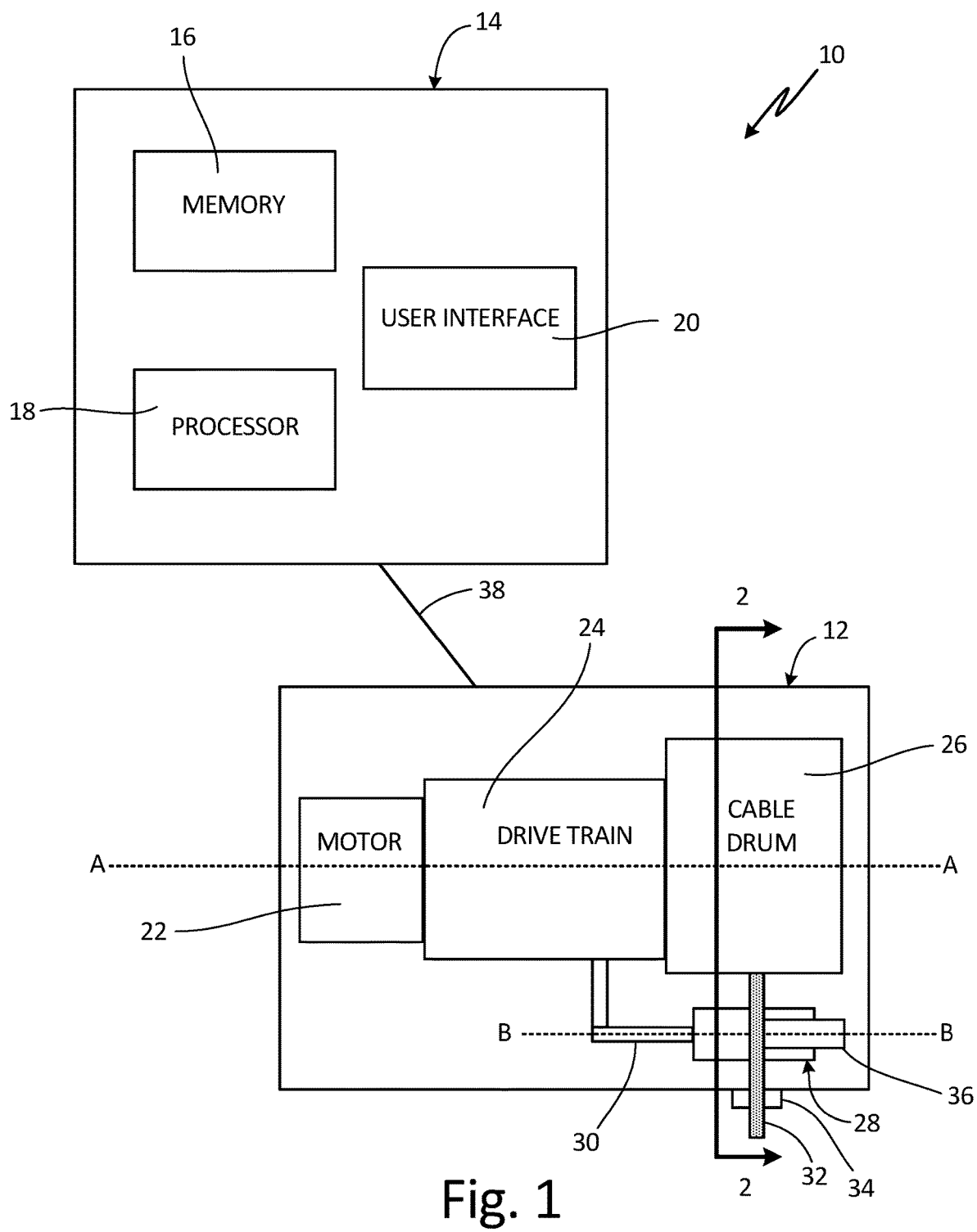
FIG. 1 is a block diagram of a rescue hoist and load detection system.

FIG. 1 is a block diagram of system 10 for detecting and providing information regarding a load on rescue hoist 12. System 10 includes computer 14, and computer 14 includes memory 16, processor 18, and user interface 20. Rescue hoist 12 includes motor 22, drive train 24, cable drum 26, traction sheave 28, drive arm 30, cable 32, cable guide 34, and load pin 36.

Rescue hoist 12 is configured to deploy and retrieve cable 32 to raise and lower objects from rescue hoist 12. Cable drum 26 of rescue hoist 12 rotates about cable drum axis A-A to deploy and retrieve cable 32 from rescue hoist 12. Motor 22 is connected to and provides rotational power to rescue hoist 12 through drive train 24. Drive train 24 is connected, either directly or indirectly, such as through an intermediate linear bearing, to cable drum 26 and drives cable drum 26 about cable drum axis A-A. Cable 32 is wound about cable drum 26 and is piled on cable drum 26 in multiple wrap layers. Cable 32 extends from cable drum 26 and through traction sheave 28, and cable 32 exits rescue hoist 12 through cable guide 34. Cable guide 34 provides a stationary exit point for cable 32 to exit from rescue hoist 12. Moreover, cable guide 34 prevents an exit angle, which is the angle between the portion of cable 32 extending between traction sheave 28 and the outlet of rescue hoist 12 and a reference axis, such as reference axis R (shown in FIGS. 2 and 3), from varying during operation. In this way, the exit angle of cable 32 from traction sheave 28 is maintained steady.

Drive arm 30 is connected, either directly or indirectly, such as through a linear bearing, to motor 22 and is configured to rotate around axis B-B. Drive arm 30 is connected to a first side of traction sheave 28. Drive arm 30 provides rotational power to traction sheave 28 to cause traction sheave 28 to rotate around axis B-B. In some examples, drive arm 30 is directly driven by a component of rescue hoist 12, such as motor 22, drive train 24, the linear bearing, cable drum 26, or some other rotating component. In some examples, drive arm 30 rotates simultaneously with cable drum 26.

Traction sheave 28 rotates on axis B-B to maintain a back tension on a portion of cable 32 extending between traction sheave 28 and cable drum 26. For example, traction sheave 28 can be underdriven or overdriven relative to cable drum 26 to maintain the back tension on cable 32. In one example, traction sheave 28 is underdriven such that traction sheave 28 rotates slower than cable drum 26 as cable 32 is wound onto cable drum 26, thereby maintaining the back tension on cable 32 during the winding process. In another example, traction sheave 28 is overdriven such that traction sheave 28 rotates faster than cable drum 26 as cable 32 is deployed from cable drum 26, thereby maintaining the back tension on cable 32 during the unwinding process. Maintaining the back tension on cable 32 ensures discrete winding of cable 32 onto cable drum 26, as any slack in the portion of cable 32 extending between cable drum 26 and traction sheave 28 can cause miswinding of cable 32 onto cable drum 26, can lead to cable 32 jamming, and/or can lead to possible breakage of cable 32.

Load pin 36 extends into traction sheave 28 and is disposed coaxially with traction sheave 28 on axis B-B. In some examples, load pin 36 extends into a second side of traction sheave 28, opposite the first side of traction sheave 28 that drive arm 30 is connected to. Load pin 36 can be mounted to a stationary component of rescue hoist 12, such that load pin 36 remains stationary as traction sheave 28 rotates about axis B-B. Load pin 36 can also be a single mounted load pin, such that one side of load pin 36 is supported and load pin 36 extends into traction sheave 28 in a cantilevered manner. As such, a device, such as a bearing, can be disposed between load pin 36 and traction sheave 28 to allow traction sheave 28 to freely rotate relative to load pin 36. In some examples, traction sheave 28 is supported on the bearing disposed between traction sheave 28 and load pin 36.

Load pin 36 includes at least one strain gauge that senses a strain experienced by load pin 36 due to a load being applied to cable 32. In some examples, load pin 36 is a single shear load pin 36, such that load pin 36 includes a single strain gauge. Where load pin 36 is single supported, the strain sensed by the strain gauge is due to a bending moment caused when a load is applied to cable 32. Strain information is communicated to computer 14 via communication link 38.

Computer 14 communicates with rescue hoist 12 via communication link 38. Communication link 38 can be a wired or wireless connection. Processor 18, in one example, is a digital logic circuit capable of executing software or other instructions, for example, stored in memory 16. Examples of processor 18 can include any one or more of a microprocessor, a controller, a digital signal processor (DSP), an application specific integrated circuit (ASIC), a field-programmable gate array (FPGA), or other equivalent discrete or integrated logic circuitry.

Memory 16, in some examples, can be configured to store information during operation of computer 14. Memory 16, in some examples, is computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 16 is a temporary memory, meaning that a primary purpose of memory 16 is not long-term storage. Memory 16, in some examples, is volatile memory, meaning that memory 16 does not maintain stored contents when power is turned off. In some examples, memory 16 is used to store program instructions for execution by processor 18. Memory 16, in one example, is used by software or applications running on computer 14 to temporarily store information during program execution.

Memory 16, in some examples, also includes one or more computer-readable storage media. Memory 16 can be configured to store larger amounts of information than volatile memory. Memory 16 can further be configured for long-term storage of information. In some examples, memory 16 includes non-volatile storage elements. Examples of such non-volatile storage elements can include magnetic hard discs, optical discs, floppy discs, flash memories, or forms of electrically programmable memories (EPROM) or electrically erasable and programmable (EEPROM) memories.

User interface 20, such as a keyboard, touchscreen, monitor, mouse, or other suitable interface device, allows a user to interact with system 10, such as by retrieving information from memory 16, receiving notifications, initiating the software stored in memory 16, and inputting additional information to memory 16, among other examples. User interface 20 can also be configured to provide an output of information to the user, such as an output of a sensed load on cable 32. For example, user interface 20 can include a sound card, a video graphics card, a speaker, a display device (such as a liquid crystal display (LCD), a light emitting diode (LED) display, an organic light emitting diode (OLED) display, etc.) or other type of device for outputting information in a form understandable to users or machines.

A look-up table can be stored in memory 16. The look-up table can include a first variable and a second variable for calculating the load on cable 32. In one example, the first variable can include an entry angle, such as entry angle $\theta$ (shown in FIGS. 2-3), of the cable 32 to traction sheave 28. The entry angle of cable 32 is the angle between the cable 32 entering traction sheave 28 and a reference axis, which can be any desired axis. In some examples, the reference axis can be a vertical axis through rescue hoist 12, such as reference axis R (shown in FIGS. 2-3). More particularly, the first variable can include a wrap layer of cable 32 about cable drum 26, which wrap layer can provide the entry angle. Cable 32 wraps around cable drum 26 in multiple layers, with each layer piled on a lower layer. As such, the entry angle of cable 32 to traction sheave 28 varies depending on which wrap layer is currently the outermost wrap layer on cable drum 26. The entry angle of each wrap layer can be predetermined and stored in memory 16. In this way, knowing which wrap layer is supplying cable 32 also provides the entry angle of cable 32 to traction sheave 28. In one example, the wrap layer can be determined based on the type of cable drum 26, the type of cable 32, and a count of shaft rotations. In one example, the second variable can include the sensed strain provided from the strain gauge mounted in load pin 36. The look-up table includes associations between the first variable and the second variable to provide the load. For example, when the first variable and the second variable are input into the look-up table, the load on cable 34 can be determined based on an intersection between the two variables.

The wrap layer can be determined based on a length of cable 32 presently deployed from rescue hoist 12. For example, computer 14 can include logic configured to monitor a length of cable 32 extending from rescue hoist 12. For example, a sensor, such as a resolver or potentiometer, can monitor shaft rotations to determine a length of cable 32 disposed on cable drum 26 based on the rotations of cable drum 26 about cable drum axis A-A. The length of cable 32 included in each wrap layer can be stored in memory 16. The wrap layer, and thus the entry angle, can thus be determined by the length of cable 32 deployed from rescue hoist 12.

During operation, cable 32 is deployed and retrieved by rescue hoist 12 to retrieve and deploy objects. When a load is applied to cable 32, traction sheave 28 experiences the load due to cable 32 extending over traction sheave 28. As traction sheave 28 is loaded, load pin 36 experiences a bending moment, and the moment causes the strain gauge to deform and provide electrical signals proportional to the strain to which the strain gauge is subjected. The strain experienced by load pin 36 and sensed by the strain gauge is proportional to the load on cable 32. The strain information is provided to computer 14 via communication link 38.

The load on cable 32 can be calculated by a load calculator, such as computer 14. In some examples, the load can be calculated based on the strain information and the wrap angle around traction sheave 28. The wrap angle is the angle between cable 32 entering traction sheave 28 and cable 32 exiting traction sheave 28. However, an exit angle, which is the angle created between the portion of cable 32 extending from traction sheave 28 to cable guide 34 and the reference axis, remains constant as cable guide 34 prevents the exit angle from changing. In some examples, the reference axis is selected as parallel to cable 32 exiting traction sheave 28, such that the exit angle is 0°. With the exit angle held steady, only the entry angle affects the wrap angle. As such, the entry angle is utilized, along with the strain information, to calculate the load on cable 32, in some examples.

The look-up table can provide the load on cable 32. The entry angle of cable 32 to traction sheave 28 can be utilized as one input variable to determine the load on cable 32, while the strain information provided from load pin 36 can be utilized as another input variable. The entry angle at any given time can be determined based on the outermost wrap layer, and the current outermost wrap layer is known from the length of cable 32 deployed. As such, the entry angle is known based on the length of cable 32 deployed from rescue hoist 12. The sensed strain is provided from load pin 36. With both the first variable, the entry angle, and the second variable, the sensed strain, known, the load on cable 32 is determined by the intersection of the first variable and the second variable in the look-up table. While the load can be calculated utilizing the look-up table, it is understood that the load can be calculated in any suitable manner.

Load pin 36 and system 10 provide significant advantages. Load pin 36 provides a hoist level load sensor that informs the crew of the actual load on cable 32. Providing hoist-level sensing helps improve mission safety by providing the crew with an accurate load reading. Moreover, load pin 36 is mounted coaxially with traction sheave 28 and can support traction sheave 28 within rescue hoist 12. Load pin 36 being a single shear load pin also reduces the complexity of load pin 36, thereby reducing manufacturing costs.

Figure 2:
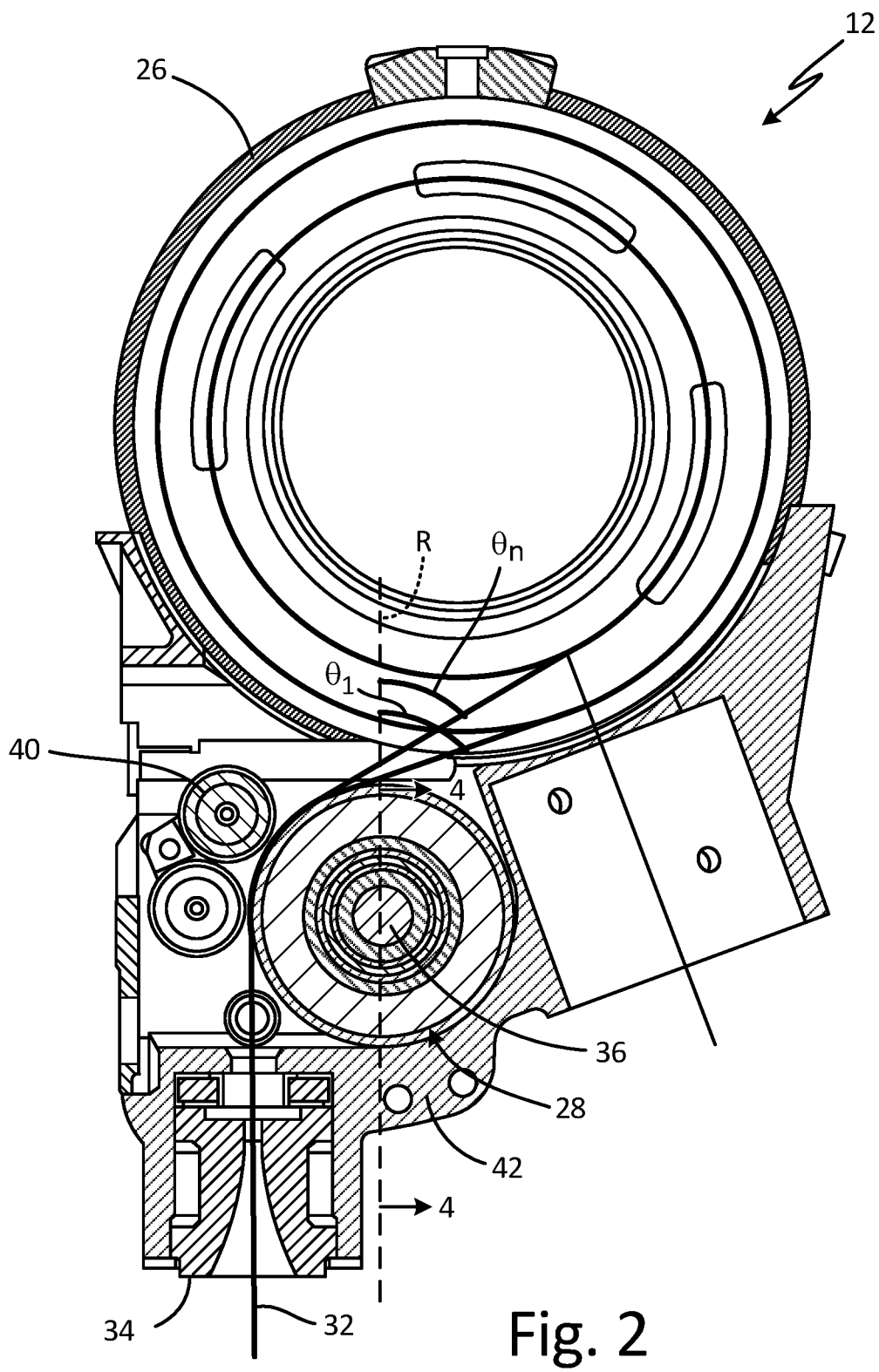
FIG. 2 is a side cross-sectional view of a rescue hoist taken along line 2-2 in FIG. 1.

FIG. 2 is a cross-sectional view of rescue hoist 12 taken along line 2-2 in FIG. 1A. Cable drum 26, traction sheave 28, cable 32, cable guide 34, load pin 36, rollers 40, and hoist housing 42 of rescue hoist 12 are shown. Cable drum 26 is rotatably driven to deploy and retrieve cable 32. Cable 32 extends from cable drum 26, over traction sheave 28, and exits rescue hoist 12 through cable guide 34. Traction sheave 28 maintains a back tension on a portion of cable extending between cable drum 26 and traction sheave 28 to ensure discrete winding of cable 32 onto cable drum 26. Rollers 40 are disposed proximate traction sheave 28 and force cable against traction sheave 28, thereby ensuring that cable 32 remains engaged with traction sheave 28. Load pin 36 extends into traction sheave 28 and is disposed coaxially with traction sheave 28. Cable guide 34 provides a stationary exit point through which cable 32 exits rescue hoist 12.

A sensed strain and entry angles $\theta_1$-$\theta_n$ (collectively referred to herein as entry angle $\theta$) are utilized to calculate the load applied to cable 32. As shown, entry angle $\theta_1$, which is the entry angle when cable 32 is fully wound, is greater than entry angle $\theta_n$, which is the entry angle when cable 32 is fully deployed. Load pin 36 includes strain gauges that provide electrical signals proportional to a strain caused on load pin 36 when a load is applied to cable 32. Load pin 36 thus provides the sensed strain. Entry angle $\theta$ is the angle between a portion of cable 32 entering traction sheave 28 and reference axis R. The exit angle is an angle between a portion of cable 32 exiting traction sheave 28 and reference axis R. While entry angle $\theta$ and the exit angle are described with reference to reference axis R, it is understood that any desired axis can be selected as the reference axis. Cable guide 34 maintains the exit angle steady throughout operation, such that the exit angle is constant. In some examples, the reference axis is selected parallel to cable 32 extending between traction sheave 28 and cable guide 34 such that the exit angle is 0°.

Unlike exit angle, entry angle $\theta$ varies during operation. Entry angle $\theta$ is dependent on the current wrap layer from which cable 32 is being deployed. For example, the outermost wrap layer when cable 32 is fully wound can have entry angle $\theta_1$, while the outermost wrap layer when cable 32 is fully deployed can have entry angle $\theta_n$. Because the exit angle is maintained as a constant, entry angle $\theta$ is the only angle required to calculate the load on cable 32. As discussed above, entry angle $\theta$ is determined by which wrap layer is the outermost wrap layer at any given time. Because rescue hoist 12 includes a finite number of wrap layers, rescue hoist 12 also includes a finite number of entry angles $\theta$. The range of entry angles for any given rescue hoist 12 can be predetermined and stored in memory 16 (shown in FIG. 1) and in the look-up table.

Figure 3:
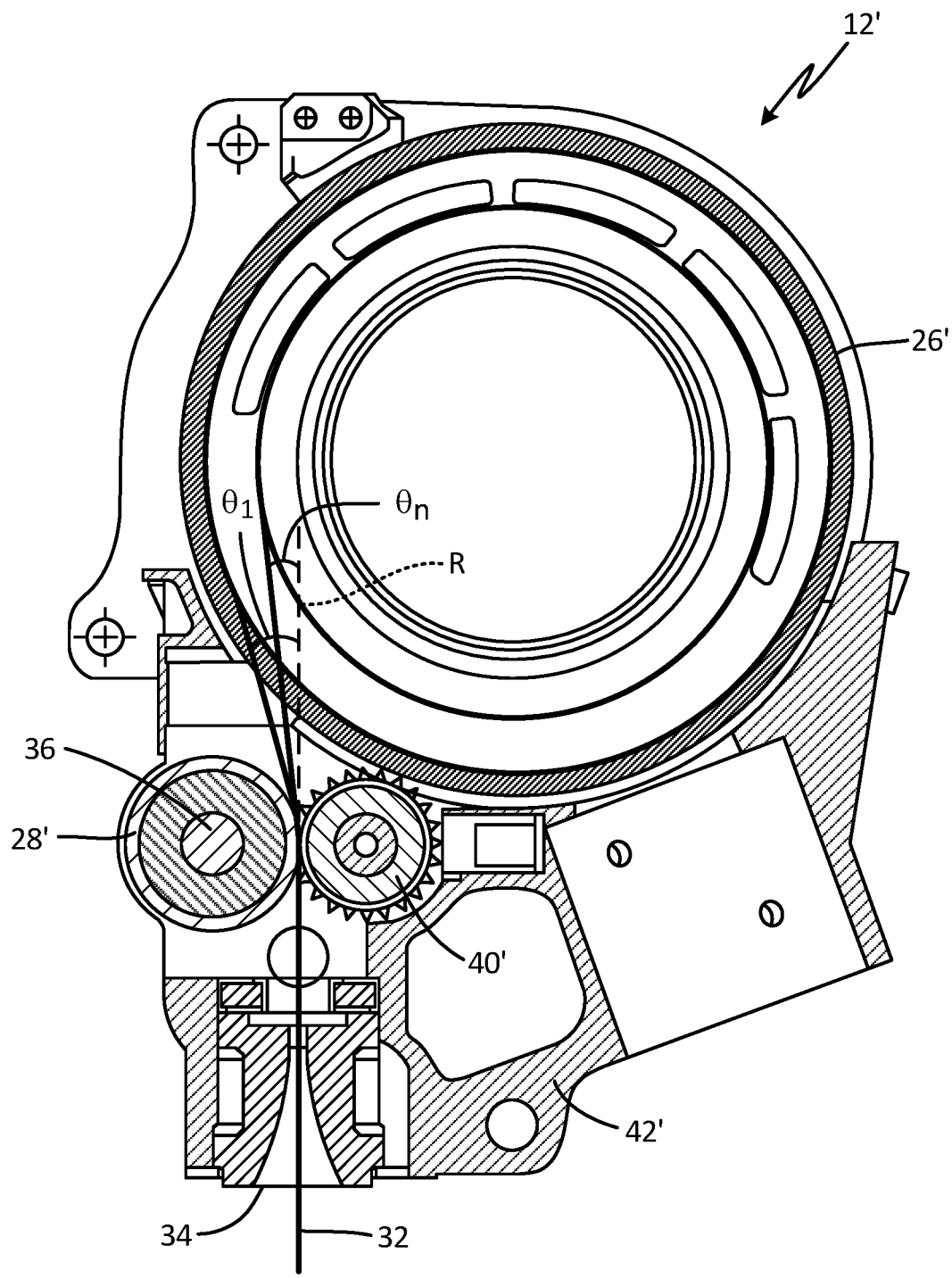
FIG. 3 is a side cross-sectional view of another rescue hoist.

FIG. 3 is a cross-sectional view of rescue hoist 12'. Cable drum 26', traction sheave 28', cable 32, cable guide 34, load pin 36, roller 40', and hoist housing 42' of rescue hoist 12' are shown. Cable drum 26' is rotatably driven to deploy and retrieve cable 32. Cable 32 extends from cable drum 26', over traction sheave 28', and exits rescue hoist 12' through cable guide 34. Traction sheave 28' maintains a back tension on a portion of cable extending between cable drum 26' and traction sheave 28' to ensure discrete winding of cable 32 onto cable drum 26'. Roller 40' is disposed proximate traction sheave 28' to force cable against traction sheave 28', thereby ensuring that cable 32 remains engaged with traction sheave 28'. Load pin 36 extends into traction sheave 28' and is disposed coaxially with traction sheave 28'. Cable guide 34 provides a stationary exit point through which cable 32 exits rescue hoist 12'.

A sensed strain and entry angles $\theta_1$-$\theta_n$ are utilized to calculate the load applied to cable 32. As shown, entry angle $\theta_1$, which is the entry angle when cable 32 is fully wound, is greater than entry angle $\theta_n$, which is the entry angle when cable 32 is fully deployed. Load pin 36 includes strain gauges that provide electrical signals proportional to a strain caused on load pin 36 when a load is applied to cable 32. Load pin 36 thus provides the sensed strain. Entry angle $\theta$ is the angle between a portion of cable 32 entering traction sheave 28' and reference axis R. The exit angle is an angle between a portion of cable 32 exiting traction sheave 28' and reference axis R. While entry angle $\theta$ and the exit angle are described with reference to reference axis R, it is understood that any desired axis can be selected as the reference axis. Cable guide 34 maintains the exit angle steady throughout operation, such that the exit angle is constant. In some examples, the reference axis is selected parallel to cable 32 extending between traction sheave 28' and cable guide 34 such that the exit angle is 0°.

Unlike exit angle, entry angle $\theta$ varies during operation. Entry angle $\theta$ is dependent on the current wrap layer from which cable 32 is being deployed. For example, the outermost wrap layer when cable 32 is fully wound can have entry angle $\theta_1$, while the outermost wrap layer when cable 32 is fully deployed can have entry angle $\theta_n$. Because the exit angle is maintained as a constant, entry angle θ is the only angle required to calculate the load on cable 32. As discussed above, entry angle θ is determined by which wrap layer is the outermost wrap layer at any given time. Because rescue hoist 12' includes a finite number of wrap layers, rescue hoist 12' also includes a finite number of entry angles θ. The range of entry angles for any given rescue hoist 12' can be predetermined and stored in memory 16 (shown in FIG. 1) and in the look-up table.

Figure 4:
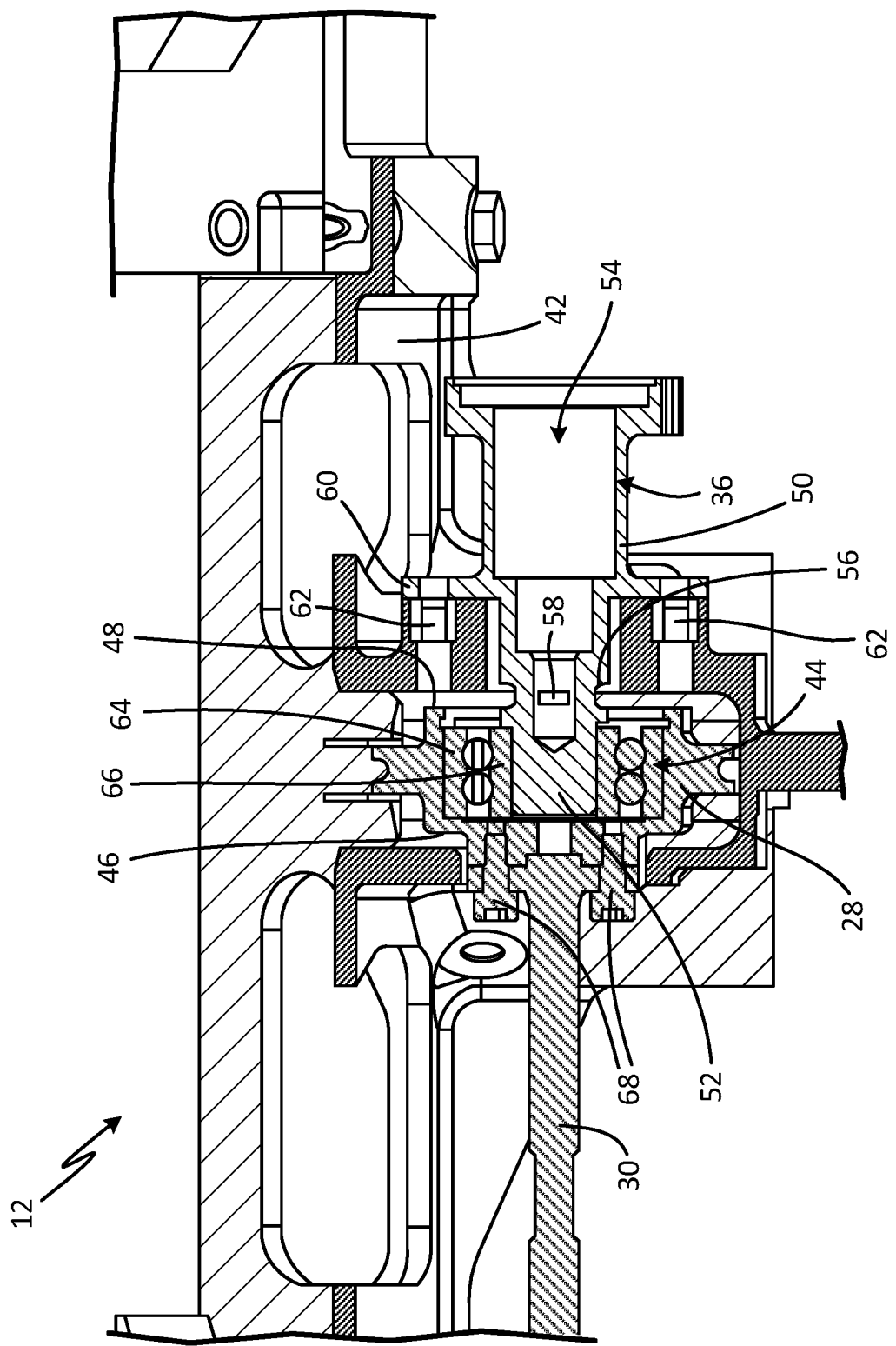
FIG. 4 is a cross-sectional view of a traction sheave and load pin taken along line 4-4 in FIG. 2.

FIG. 4 is a cross-sectional view of rescue hoist 12 taken along line 4-4 in FIG. 2. Traction sheave 28, drive arm 30, load pin 36, hoist housing 42, and bearing 44 of rescue hoist 12 are shown. Traction sheave 28 includes first side 46 and second side 48. Load pin 36 includes body 50, distal end 52, bore 54, circumferential groove 56, strain gauge 58, mounting flange 60. Hoist housing 42 includes bushings 62. Bearing 44 includes outer race 64 and inner race 66.

Load pin 36 extends into second side 48 of traction sheave 28, with distal end 52 disposed within inner race 66 of bearing 44. Inner race 66 of bearing 44 is mounted on distal end 52, and outer race 64 of bearing 44 is attached to traction sheave 28. Bearing 44 supports traction sheave 28 on load pin 36, and bearing 44 enables traction sheave 28 to rotate about axis B-B while load pin 36 is maintained stationary. Load pin 36 supports traction sheave 28 on rescue hoist 12, through bearing 44. Drive arm 30 is attached to first side 46 of traction sheave 28 by fasteners 68. Fasteners 68 can be any suitable fastener for connecting traction sheave 28 and drive arm 30 and for transferring rotational power from drive arm 30 to traction sheave 28.

Bore 54 extends into body 50 of load pin 36. Mounting flange 60 extends radially from body 50 and is connected to hoist housing 42. Bushings 62 are disposed in hoist housing 42 and are configured to receive fasteners to secure load pin 36 to hoist housing 42. Bushings 62 support load pin 36 radially and locate load pin 36 on hoist housing 42. Circumferential groove 56 extends about an outer surface of body 50 and is disposed proximate distal end 52. Strain gauge 58 is mounted within bore 54 proximate circumferential groove 56. Strain gauge 58 is configured to sense the bending moment created when a load is applied to traction sheave 28.

Load pin 36 can be single mounted such that one end of load pin 36 is supported by hoist housing 42. Load pin 36 can also be single shear, such that load pin 36 includes a single strain gauge location, though it is understood that load pin 36. Load pin 36 being a single mounted, single shear load pin allows traction sheave 28 to be rotatably driven on axis B-B by drive arm 30, as drive arm 30 is able to connect to first side 46 of traction sheave 28.

During operation cable 32 (best seen in FIGS. 2 and 3) extends over traction sheave 28 before exiting rescue hoist 12. Drive arm 30 rotatably drives traction sheave 28 around axis B-B to cause traction sheave 28 to maintain a back tension on a portion of cable 32 extending between cable drum 26 (shown in FIG. 1) and traction sheave 28. When a load is applied to cable 32, the load causes traction sheave 28 to displace. The load thus causes traction sheave 28 to displace distal end 52 of load pin 36, thereby creating a bending moment on load pin 36. The bending moment induces a change in the electrical resistance of strain gauge 58, which corresponds to the strain experienced by load pin 36 due to the load. The sensed strain is output to computer 14 (shown in FIG. 1) and utilized to calculate the load on cable 32.

Load pin 36 provides significant advantages. Load pin 36 is a single mounted, single shear load pin, which allows traction sheave 28 to be connected to drive arm 30 and to be rotatably driven by drive arm 30. As such, load pin 36 provides hoist-level sensing while allowing traction sheave 28 to maintain the back tension on cable 32. Moreover, a single shear load pin requires less precision machining than a double shear load pin, thereby reducing manufacturing costs. Load pin 36 is also sufficiently robust, such that load pin 36 supports traction sheave 28 and bearing 44.

DISCUSSION OF POSSIBLE EMBODIMENTS

The following are non-exclusive descriptions of possible embodiments of the present invention.

A load sensing device for a rescue hoist includes a load pin extending into a first side of a traction sheave and disposed coaxially with the traction sheave on a traction sheave axis, and a load calculator connected to the load pin, the load calculator configured to receive a sensed strain from the load pin, to determine an entry angle of the cable to the traction sheave, and to determine a cable load based on the sensed strain and the entry angle. The traction sheave is configured to be rotatably driven relative to the load pin.

The load sensing device of the preceding paragraph can optionally include, additionally and/or alternatively, any one or more of the following features, configurations and/or additional components:

The traction sheave can maintain a cable tension on a portion of a cable extending between the traction sheave and a cable drum.

A drive arm connected to a second side of the traction sheave, the drive arm configured to rotatably drive the traction sheave around the traction sheave axis to thereby maintain the cable tension.

A bearing supporting the traction sheave on the load pin such that the traction sheave is rotatable relative to the load pin.

An inner race of the bearing is disposed about and supported on the load pin, and an outer race of the bearing is attached to the traction sheave.

The load pin is cantilevered and includes a distal end disposed within and supporting the traction sheave.

The load pin includes a body extending into the traction sheave, the body including the distal end and a bore extending through the body, an circumferential groove extending into an outer surface of the body, and a strain gauge disposed within the bore and mounted relative to the circumferential groove.

The load pin includes a mounting flange extending from the body, the mounting flange disposed on an opposite side of the circumferential groove from the distal end.

The load calculator is configured to determine the entry angle of the cable based on a wrap count.

The load calculator includes a processor and a memory encoded with instructions that, when executed by the processor, cause the processor to determine the cable load based on an intersection of a first variable and a second variable in a look-up table.

The first variable is the entry angle and the second variable is the sensed strain.

The entry angle is based on an outermost cable wrap layer of a plurality of cable wrap layers.

A rescue hoist includes a cable drum rotatable about a cable drum axis, a stationary frame supporting the cable drum, a traction sheave configured to maintain a back tension on a portion of a cable extending between the cable drum and the traction sheave, the traction sheave rotatable about a traction sheave axis, a load pin extending into a first side of the traction sheave and disposed coaxially with the traction sheave, a cable disposed on the cable drum in a plurality of cable wrap layers, and a load calculator connected to the load pin and configured to receive a sensed strain from the load pin, to determine an entry angle of the cable to the traction sheave, and to determine a cable load based on the sensed strain and the entry angle. The load pin includes a body including a distal end and a bore extending through the body, the distal end extending at least partially into the traction sheave and a strain gauge mounted within the bore.

The rescue hoist of the preceding paragraph can optionally include, additionally and/or alternatively, any one or more of the following features, configurations and/or additional components:

A drive arm connected to a second side of the traction sheave, the drive arm configured to drive the traction sheave about the traction sheave axis to thereby maintain the cable tension wherein the drive arm is configured both to underdrive the traction sheave relative to the cable drum and to overdrive the traction sheave relative to the cable drum.

The drive arm is configured to rotate the traction sheave concurrently with a cable drum rotation.

A bearing supporting the traction sheave on the load pin such that the traction sheave is rotatable relative to the load pin.

An inner race disposed about and supported on the load pin and an outer race attached to the traction sheave. The load pin supports the traction sheave through the bearing.

A processor and a memory encoded with instructions that, when executed by the processor, cause the processor to determine the cable load based on an intersection of a first variable and a second variable in a look-up table. The first variable is the entry angle and the second variable is the sensed strain.

The entry angle is based on an outermost cable wrap layer of the plurality of cable wrap layers.

The load calculator is further configured to determine the outermost wrap layer based on a length of cable deployed from cable drum.

A method of sensing a load on a cable of a rescue hoist includes sensing, with a strain gauge disposed in a load pin, a strain caused by the load on the cable, wherein the load pin is cantilevered from a stationary housing of the rescue hoist and a distal end of the load pin extends into a traction sheave, is disposed coaxially with the traction sheave, and supports the traction sheave; providing the sensed strain to a processor of a computer; determining, with the processor of the computer, a length of cable deployed from the rescue hoist with the processor, which one of a plurality of cable wrap layers is supplying the cable to the traction sheave based the length of cable deployed, and an entry angle of the rescue hoist cable to the traction sheave based on the one of the plurality of cable wrap layers providing the cable to the traction sheave; recalling, from a memory of the computer, a look-up table; and determining, with the processor of the computer, the load on the cable based on an intersection of a first variable and a second variable in the look-up table, wherein the first variable is the entry angle and the second variable is the sensed strain.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A load sensing device for an aircraft-mounted rescue hoist, the load sensing device comprising:
a load pin extending into a first side of a traction sheave and disposed coaxially with the traction sheave on a traction sheave axis, the traction sheave configured to maintain a cable tension on a portion of a cable extending between the traction sheave and a cable drum;
a drive arm connected to a second side of the traction sheave and disposed coaxially with the traction sheave, the drive arm configured to drive rotation of the traction sheave about the traction sheave axis and relative to the load pin to maintain the cable tension on the portion of the cable extending between the cable drum and the traction sheave; and
a load calculator communicatively connected to the load pin, the load calculator configured to receive a sensed strain from the load pin, to determine an entry angle of the cable to the traction sheave, and to determine a cable load based on the sensed strain and the entry angle;
wherein the cable is wrapped on the cable drum such that the cable is stacked in a plurality of cable wrap layers extending radially relative to a cable drum axis of rotation; and
wherein the entry angle is based on which one of the plurality of cable wrap layers is a radially outermost one of the plurality of cable wrap layers.

2. The device of claim 1, wherein the drive arm is configured both to underdrive the traction sheave relative to the cable drum and to overdrive the traction sheave relative to the cable drum.

3. The device of claim 1, further comprising:
a bearing supporting the traction sheave on the load pin such that the traction sheave is rotatable relative to the load pin.

4. The device of claim 3, wherein:
an inner race of the bearing is disposed about and supported on the load pin; and
an outer race of the bearing is attached to the traction sheave.

5. The device of claim 1, wherein the load pin is cantilevered and includes a distal end disposed within and supporting the traction sheave.

6. The device of claim 5, wherein the load pin further comprises:
a body extending into the traction sheave, the body including the distal end and a bore extending through the body;
an circumferential groove extending into an outer surface of the body; and
a strain gauge disposed within the bore and mounted relative to the circumferential groove.

7. The device of claim 6, wherein the load pin further comprises a mounting flange extending from the body, the mounting flange disposed on an opposite side of the circumferential groove from the distal end.

8. The device of claim 1, wherein the load calculator comprises:
a processor; and
a memory encoded with instructions that, when executed by the processor, cause the processor to determine the cable load based on an intersection of a first variable and a second variable in a look-up table.

9. The device of claim 8, wherein:
the first variable is the entry angle; and
the second variable is the sensed strain.

10. A rescue hoist comprising:
a cable drum rotatable about a cable drum axis, wherein the cable drum is driven to rotate the cable drum about the cable drum axis to spool and unspool a cable from the cable drum, and wherein the cable is stacked on the cable drum in a plurality of cable wrap layers extending radially relative to the cable drum axis;
a stationary frame supporting the cable drum;
a traction sheave configured to maintain a back tension on a portion of the cable extending between the cable drum and the traction sheave, the traction sheave rotatable about a traction sheave axis;
a load pin extending into a first side of the traction sheave and disposed coaxially with the traction sheave, the load pin comprising:
a body including a distal end and a bore extending through the body, the distal end extending at least partially into the traction sheave; and
a strain gauge mounted within the bore;
a drive arm disposed coaxially with the traction sheave and connected to a second side of the traction sheave, the drive arm configured to drive the traction sheave about the traction sheave axis to thereby maintain the back tension; and
a load calculator connected to the load pin and configured to receive a sensed strain from the load pin, to determine an entry angle of the cable to the traction sheave from the cable drum, and to determine a cable load based on the sensed strain and the entry angle;
wherein the entry angle is based on which one of the plurality of cable wrap layers is a radially outermost cable wrap layer of the plurality of cable wrap layers.

11. The rescue hoist of claim 10, wherein the drive arm is configured both to underdrive the traction sheave relative to the cable drum and to overdrive the traction sheave relative to the cable drum.

12. The rescue hoist of claim 11, wherein the drive arm is configured to rotate the traction sheave concurrently with a cable drum rotation.

13. The rescue hoist of claim 10, further comprising:
a bearing supporting the traction sheave on the load pin such that the traction sheave is rotatable relative to the load pin.

14. The rescue hoist of claim 13, wherein the bearing comprises:
an inner race disposed about and supported on the load pin; and
an outer race attached to the traction sheave;
wherein the load pin supports the traction sheave through the bearing.

15. The rescue hoist of claim 10 wherein the load calculator comprises:
a processor; and
a memory encoded with instructions that, when executed by the processor, cause the processor to determine the cable load based on an intersection of a first variable and a second variable in a look-up table;
wherein the first variable is the entry angle and the second variable is the sensed strain.

16. The rescue hoist of claim 10, wherein the load calculator is further configured to determine which cable wrap layer of the plurality of cable wrap layers is the radially outermost cable wrap layer based on a length of cable deployed from the cable drum.

17. The device of claim 1, wherein the load calculator is configured to determine which one of the plurality of cable wrap layers is the radially outermost one of the plurality of cable wrap layers based on a length of the cable deployed from the cable drum.

* * * * *